United States Patent [19]

Lee et al.

[11] 3,903,378

[45] Sept. 2, 1975

[54] ARRANGEMENT FOR CONTROLLING THE GAIN OF TWO-WAY AMPLIFIERS IN ACCORDANCE WITH LOOP LENGTHS

[75] Inventors: David Q. Lee, Chicago; Dinesh K. Srivastava, Westmont, both of Ill.

[73] Assignee: GTE Automatic Electric Laboratories Incorporated, Northlake, Ill.

[22] Filed: Mar. 27, 1974

[21] Appl. No.: 455,431

[52] U.S. Cl. .......... 179/170 R; 179/16 F

[51] Int. Cl.² .......... H04B 3/36

[58] Field of Search .......... 179/170 R, 77, 16 F, 1 F; 330/35, 86

[56] References Cited

UNITED STATES PATENTS

| | | | |
|---|---|---|---|
| 3,035,122 | 5/1962 | Livingstone | 179/16 F |
| 3,578,914 | 5/1971 | Simonelli | 179/16 F |
| 3,581,223 | 5/1971 | Armstrong | 330/86 |
| 3,689,704 | 9/1972 | Wadding | 179/16 F |
| 3,731,012 | 5/1973 | Shaffer | 179/16 F |
| 3,781,481 | 12/1973 | Shaffer et al. | 179/170 R |
| 3,829,626 | 8/1974 | Irwin et al. | 179/170 R |

*Primary Examiner*—William C. Cooper
*Assistant Examiner*—Randall P. Myers
*Attorney, Agent, or Firm*—Robert J. Black

[57] ABSTRACT

An arrangement is provided for controlling the gain of two-way amplifiers, in accordance with loop lengths. The voltage drop caused by a constant current device impressed on a variable length loop is used to control the gain of the two-way amplifiers by applying the variable voltage as a control for a voltage controlled resistance such as a field effect transistor coupled with an attenuator which is part of the gain-determining network of the amplifiers. Since the voltage drop across the constant current device is inversely proportional to loop lengths, and hence directly proportional to the desired additional loss, this voltage is used to reduce the effective feedback resistance of the amplifiers and hence their overall gain. The amplifier outputs thus are compensated for different loop lengths.

6 Claims, 1 Drawing Figure

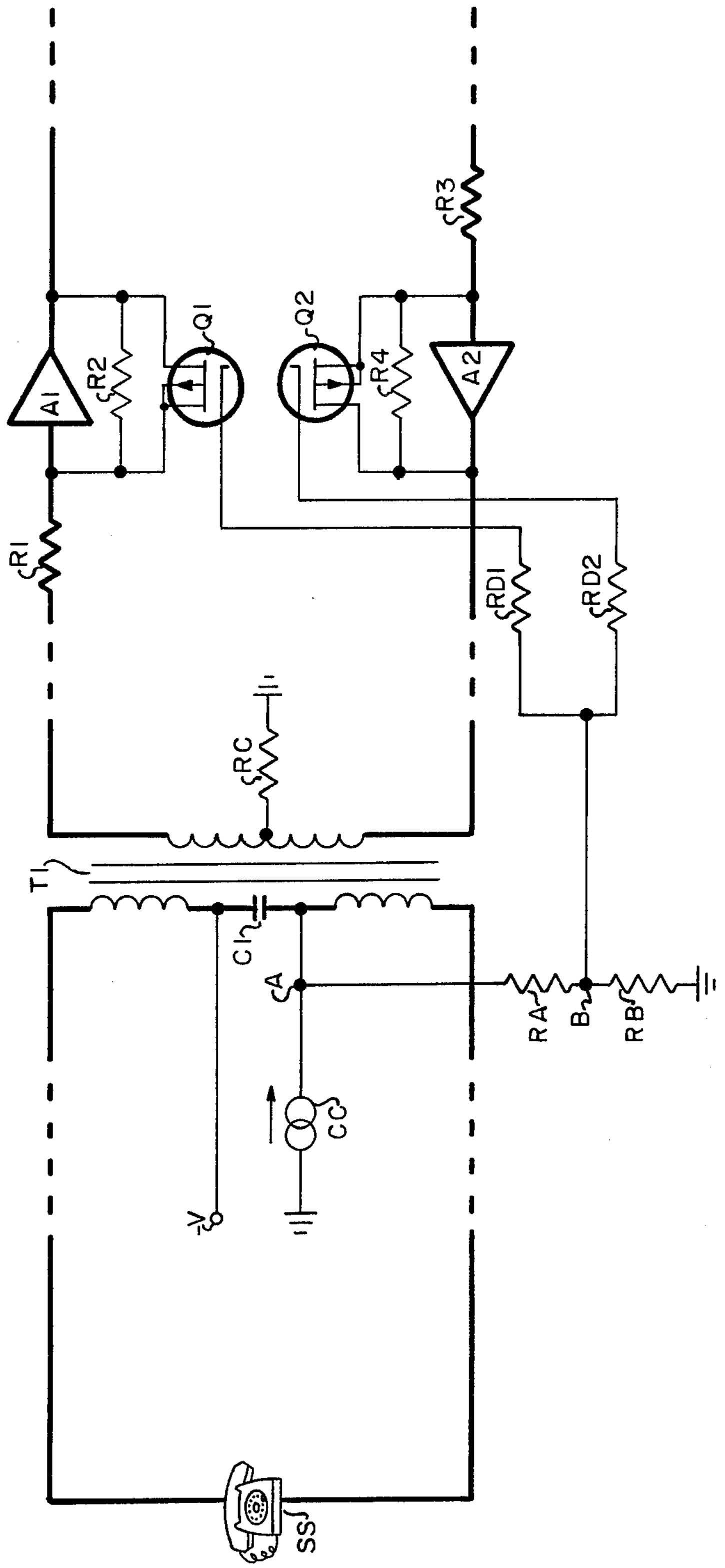
A1
A2
Q1
Q2
R1
R2
R3
R4
RD1
RD2
RC
T1
C1
A
B
RA
RB
CC
-V
SS

ARRANGEMENT FOR CONTROLLING THE GAIN OF TWO-WAY AMPLIFIERS IN ACCORDANCE WITH LOOP LENGTHS

This invention relates to an arrangement for controlling the gain of two-way amplifiers in a telephone system, according to loop lengths.

In a telephone system, it is frequently necessary to transmit signals over lines of different length, depending upon the distance of subscriber stations from an exchange. It therefore happens that the signals transmitted over communication lines are from case to case differently attenuated depending upon the involved line. This is generally undesirable and several suggestions have become known aiming at the elimination of this phenomenon.

For example, in normal battery feed operation, the telephone apparatus at a subscriber station includes means for increasing its loss for shorter loops, as a result of the larger current flowing through it under that condition. In this fashion, the telephone apparatus attempts to maintain a constant output for different loop lengths.

An alternate method of battery feed is through a constant current device. However, with this arrangement, with constant minimum current flowing, the telephone apparatus adjusts its loss to a minimum which does not change for shorter loops. As a result, for less than maximum loop length operation, the signal output is greater than nominally desired.

If the constant current device could sense different loop lengths by outputting different voltages, then this voltage could be used to increase the loss of an attenuator which is part of the gain-determining network of the two-way amplifiers used in the telephone system. The loss can be controlled in such a way that its magnitude is the same as would occur in the telephone apparatus at a subscriber station. The situation then would be analogous to the telephone apparatus increasing its loss for shorter loops.

In accordance with the present invention, an arrangement is provided for controlling the gain of such two-way amplifiers, in accordance with loop lengths. The voltage drop caused by a constant current device impressed on a variable length loop is used to control the gain of the two-way amplifiers by applying the variable voltage as a control for a voltage controlled resistance such as a field effect transistor coupled with an attenuator which is part of the gain-determining networks of the amplifiers. Since the voltage drop across the constant current device is inversely proportional to loop lengths, and hence directly proportional to the desired additional loss, this voltage is used to reduce the effective feedback resistance of the amplifiers and hence their overall gain. The amplifier outputs thus are compensated for different loop lengths.

With this arrangement, various advantages are provided. For example, compensation is automatically provided for loop lengths which are less than maximum. In addition, the current sensing devices normally provided in telephone apparatus at a subscriber station for compensating for shorter loops can be eliminated. The arrangement further offers greater flexibility in adjusting the constant output level for any loop length, independent of the changes in battery voltage.

Accordingly, it is an object of the present invention to provide an improved arrangement for automatically compensating for different loop lengths fed by a constant current device, to provide constant output levels.

More particularly, it is an object to provide an improved arrangement for the automatic gain compensation of two-way amplifiers for different loop lengths fed by a constant current device.

Other objects of the invention will in part be obvious and will in part appear hereinafter.

For a fuller understanding of the nature and objects of the invention, reference should be had to the following detailed description taken in connection with the accompanying drawings, in which:

FIG. 1 is an electrical schematic of an arrangement exemplary of the invention, for automatically compensating for the gain of two-way amplifiers for different loop lengths fed by a constant current device.

Referring now to the drawing, a subscriber station SS is illustrated coupled to the primary winding of a line transformer T1. Line current is supplied to the subscriber station SS by means of an office battery (—V), through a constant current device CC. A capacitor C1 is provided for isolation and for providing a voice transmission path, in the manner well-known in the art.

Coupled with the secondary winding of the line transformer T1 are two one-way amplifiers A1 and A2, which may be conventional types of operational amplifiers having resistances R2 and R4, respectively, as part of the gain determining networks thereof. Initially, as is common practice, the resistances R2/R1 and R4/R3 are adjusted to provide the maximum gain output from the amplifiers. The resistance Rc terminates the secondary winding with matched impedances.

In the above respects, the illustrated arrangement is conventional, in both design and operation. For the sake of clarity, only those portions of the various devices necessary for an understanding of the invention, are illustrated.

In accordance with the present invention, voltage controlled resistances in the form of a pair of field effect transistors Q1 and Q2 are connected in parallel with the resistances R2 and R4, respectively, of the gain determining networks for the amplifiers A1 and A2. These field effect transistors Q1 and Q2 are P-channel insulated gate types, or MOSFET's, with the source s and drain d electrodes thereof connected to the opposite ends or terminals of the resistances R2 and R4. The gate g of the MOSFET Q1 is connected through an isolating resistance $R_{D1}$ to a voltage dividing network formed of the resistances $R_A$ and $R_B$, while the gate g of the MOSFET Q2 is connected through the isolating resistance $R_{D2}$ to the same point of the voltage dividing network. The voltage dividing network $R_A$ and $R_B$ forms a voltage attenuating network for reducing the voltage at point B to DC control voltages within the linear operating ranges of the MOSFET's Q1 and Q2.

As indicated above, the loop lengths from the subscriber stations such as the subscriber station SS to an exchange may differ, and hence signals transmitted are differently attenuated depending upon the involved station or loop length. In accordance with the present invention, the phenomenon is eliminated by presetting the magnitude of the output current of the constant current device CC for the longest loop-length operation, whereby the loss-introducing capability of the telephone apparatus at a subscriber station is automatically electrically disabled, thus allowing the telephone apparatus to output its maximum audio levels, and the voltage at point A is the least negative. The MOSFETs Q1 and Q2, at this time, operate as voltage controlled resistors sitting at the maximum value when the potential at point A is least negative, and allow the amplifiers A1 and A2 to operate at their maximum gain.

However, for shorter loops, the loop resistance is lower, but the loop current and the battery voltage are essentially constant, hence the potential at point A becomes more negative. This causes the MOSFETs Q1 and Q2 to turn on, thereby effectively reducing their source to drain resistance. With their source to drain resistances reduced, the gain of the amplifiers A1 and A2 are correspondingly decreased, so that the outputs of these amplifiers remains effectively constant. More particularly, because of the constant-current feed, the telephone apparatus at a subscriber station SS outputs maximum audio levels for any loop length. For shorter loop lengths, the audio levels thus are increased beyond desired levels. However, the combined effect of this increased level and the decreased gain of the amplifiers A1 and A2 is to produce an overall gain which is fully automatically compensated to be constant for any loop length.

As indicated above, since the telephone apparatus is always working in its maximum gain mode, and loss compensation is made up in the amplifiers A1 and A2, the compensating networks normally provided in the telephone apparatus can be eliminated.

It will thus be seen that the objects set forth above among those made apparent from the preceding description, are efficiently attained and certain changes may be made in carrying out the above method and in the construction set forth. Accordingly, it is intended that all matter contained in the above description or shown in the accompanying drawings shall be interpreted as illustrative and not in a limiting sense.

Now that the invention has been described, what is claimed as new and desired to be secured by Letters Patent is:

1. In a telephone system, a subscriber station connected to an exchange by means of a communication line of an established loop length, said exchange including: amplifier means including a gain determining network connected in said communication line to said subscriber station, for amplifying the audio output signals from said subscriber station; voltage controlled resistance means comprising an insulated gate field effect transistor, coupled to said gain determining network, normally operated such that said gain determining network causes said amplifier means to operate at maximum gain; means including a constant current device connected to said subscriber station by means of said communication line, for energizing said subscriber station, the voltage drop across said constant current device dependent upon the loop length of said communication line, connecting means coupling said constant current device to said voltage controlled resistance means, said voltage controlled resistance means operated in response to the voltage drop across said constant current device, said connecting means including a voltage attenuating network for reducing the voltage within the linear operating range of said transistor; whereby the gain of said amplifier means is automatically adjusted in accordance with the loop length of said communication line so as to provide a constant audio output level regardless of the loop length.

2. In a telephone system, the arrangement of claim 1, wherein said constant current device is adjusted for maximum loop length operation, the voltage drop across said constant current device when adjusted for maximum loop length operation operating said voltage controlled resistance means such that said gain-determining network operates said amplifier means at maximum gain.

3. In a telephone system, the arrangement of claim 1 wherein said constant current device is adjusted for maximum loop length operation, and wherein the arrangement is such that the combined effect of increased audio output levels from said subscriber station and the decrease in the gain of said amplifier means is such as to produce an overall gain which is fully compensated to be constant for any loop length.

4. In a telephone system, a subscriber station connected to an exchange by means of a communication line of an established loop length, said exchange including: amplifier means in said communication line coupled to said subscriber station including a gain determining network, for amplifying the audio output signal of said subscriber station; voltage controlled resistance means comprising an insulated gate field effect transistor, coupled to said gain determining network; means including a constant current device for energizing said subscriber station over said communication line, the voltage drop across said constant current device dependent on the loop length of said communication line; and connecting means coupling said constant current device to said voltage controlled resistance means for controlling its operation in response to the voltage drop across the constant current device; said connecting means including a voltage attenuating network for reducing the voltage within the linear operating range of said transistor; the arrangement being such that the gain of said amplifier means is automatically compensated for any loop length.

5. In a telephone system, the arrangement of claim 4, wherein said constant current device is adjusted for maximum loop length operation and said amplifier means is caused to operate at maximum gain.

6. In a telephone system, the arrangement of claim 5, wherein the gain of said amplifier means is decreased for shorter loop lengths to compensate for the increase in audio output levels from said subscriber station.

* * * * *